Jan. 29, 1957 J. E. STEWART 2,779,187
TORQUOMETER
Filed April 5, 1955
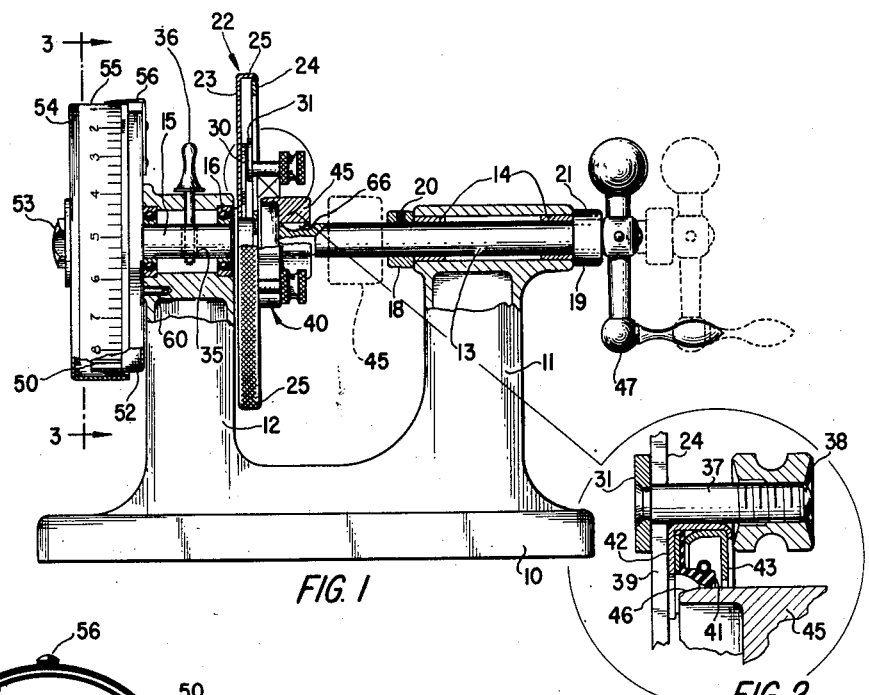
FIG. 1
FIG. 2
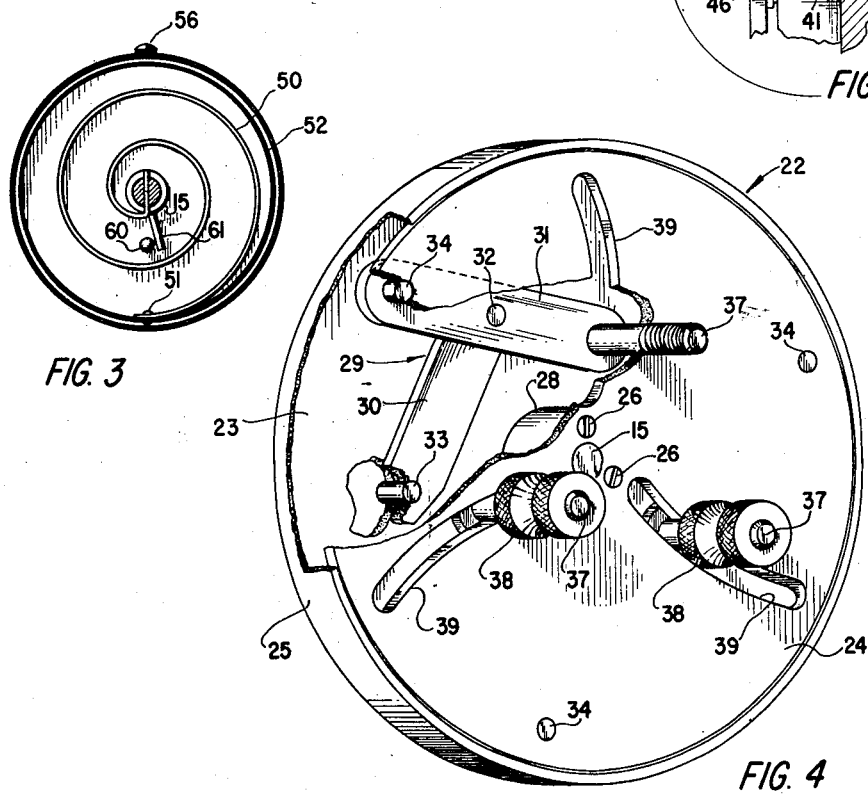
FIG. 3
FIG. 4

United States Patent Office 2,779,187
Patented Jan. 29, 1957

2,779,187

TORQUOMETER

John E. Stewart, Redwood City, Calif., assignor, by mesne assignments, to Federal-Mogul-Bower Bearings, Inc., Detroit, Mich., a corporation of Michigan Application April 5, 1955, Serial No. 499,336

7 Claims. (Cl. 73—9)

This invention relates to torquometers, and more particularly to a simple yet highly accurate and versatile device for measuring the frictional losses between the relatively rotating elements of test specimens.

The torquometer provided by the present invention is especially adapted for measuring the torque losses of devices such as anti-friction bearings and shaft type oil seals. In contrast to comparable precision devices heretofore available, the present instrument is light in weight, compact and so ruggedly constructed as to be equally suitable for portable or laboratory use.

Another feature of the design is the ease and facility with which test specimens of widely varying types and dimensions can be placed on test. Featured also is an automatic fast-acting centering device by which a specimen can be aligned with the axis of the instrument and held there while being rigidly clamped in place. During this operation, and in fact at all times except when an actual test is in progress, positive means are provided for safeguarding the calibrated spring measuring device against movement or strain.

Numerous other advantages and objects of the invention will become readily apparent from the following detailed specification of an illustrative embodiment of the invention taken in connection with the accompanying drawings, wherein:

Figure 1 is a front elevation view of the instrument with parts broken away to show constructional details;

Figure 2 is a fragmentary view on an enlarged scale through an oil seal clamped in place for testing;

Figure 3 is a view taken along line 3—3 on Figure 1 showing the torsion spring housing with the cover removed; and Figure 4 is an isometric view of the clamping means as well as of automatic specimen centering device with parts broken away.

Referring to the drawings, and particularly to Figure 1, it will be seen that the torquometer includes a generally U-shaped main frame having a base 10 and upstanding integral pedestals 11 and 12. A driving spindle 13 is suitably mounted in bearings 14 carried by pedestal 11, while a driven spindle 15 is mounted in anti-friction bearing 16, 16 at the upper end of pedestal 12. For obvious reasons it is important that the axes of spindles 13 and 15 coincide accurately with one another. Likewise, it is important that the spindles, and especially spindle 15, operate without runout or play in the supporting bearings and that these bearings offer a minimum of friction. Spindle 15 is so supported in its bearings that it cannot move axially, while driving spindle 13 is free to shift axially for a considerable distance as permitted by adjustable collars 18 and 19. The collars are provided with set screws 20, 21 for the purpose of clamping the collars in any desired position along the spindle, and particularly to accommodate different size mandrels for reasons explained below.

On the inboard or right-hand end of spindle 15 is a test specimen supporting and centering device generally designated 22. An enlarged view of the device is shown in Figure 4. It includes a large diameter shallow case 23 and a closure disk 24 having its exterior surface substantially flush with the edge of rim 25 on casing 23. Closure disk 24 is rigidly secured to the end of spindle 15 as by screws 26. An opening 28 at the center of case 23 has a close-tolerance running fit with the surface of spindle 15. Hence, it is held accurately positioned on the spindle yet rotates freely. Casing 23 acts as a partial support and as an actuating means for three pairs of identical floating linkages generally designated 29, and only one of which is illustrated in full in Figure 4.

Each linkage 29 comprises a short link 30 and a long link 31. One end of the shorter link is pivotally connected to an intermediate portion of link 31 by an accurately finished pin 32. Similar pins 33 and 34 serve to connect the outer ends of both links to disks 23 and 24 respectively, at highly precise equi-distantly spaced points near their peripheries.

Normally, spindle 15 and disk 24 carried thereby are locked against rotation by means of a locking pin 36 which extends downwardly through a hole in the top of pedestal 12 into a passage 35 in the spindle. Consequently, it will be clear that if the operator grasps knurled rim 25 of disk 23 and rotates it slightly in opposite directions, floating linkages 29 will open and close as they swing about pivots 34. Thus, if the operator rotates case 23 counter-clockwise as viewed in Figure 4, link 30 will be rotated in the same direction to pivot longer link 31 clockwise about fixed pivot 34. On the other hand, if outer case 23 is rotated clockwise, link 30 will be rotated in the same direction to swing link 31 counter-clockwise about pivot 34.

Projecting axially from the free end of links 31 are a plurality of accurately ground stud pins 37, only the outer ends of which are threaded to receive a clamping nut 38. These nuts are relatively thick and only the outer ends are threaded, as clearly shown in Figure 2. The reason for this is that the unthreaded shank portions of the stud are of slightly larger diameter than the threaded outer ends in order that they may be accurately finished and precisely located with respect to the axis of spindle 15. In this connection, the cylindrical surface of the unthreaded shanks of each of the three pins is positioned equi-distantly from the axis for a reason that will be explained presently. Studs 37 project through wide arcuate lot 39 in cover disk 24. As best shown in Figure 2, the face of link 31 is immediately adjacent the rear surface of cover disk 24. Accordingly, the tightening of clamping nut 38 against the rim of an underlying test specimen suffices to clamp the specimen rigidly against the outer surface of the cover disk while clamping link 31 tightly against the rear surface.

If the specimen to be tested is a shaft seal of a typical design generally indicated at 40, it will include a resilient annular sealing lip 41 anchored between outer and inner cupped cases 42 and 43. The external diameters of such seals are accurately finished to a predetermined diameter concentric with the edge of sealing lip member 41. Clamping a specimen of such a seal rigidly in place against the face of cover disk 24 with lip 41 accurately centered about the axis of spindle 15, irrespective of whether the external diameter of the seal is large or small, is a simple matter with the present test instrument. The operator merely loosens clamping nuts 38 as he places his left hand on the knurled rim 25 and rotates it slightly clockwise thereby moving the clamping and centering studs 37 to the outer ends of slots 39. The operator then inserts the test specimen against the outer surface of disk 24 and reverses the movement of disk 23 until each of pins 37 rests lightly against the exterior rim of the specimen. This is easily checked by noting whether the uppermost pin rests against the case. Since the surfaces of pins 37 are accurately spaced from the axis of the spindle, the operator then knows that the specimen is accurately centered. Clamping nuts 38 can now be tightened firmly against the rim of the specimen to complete the mounting operation.

A mandrel 45 having an external diameter identical with the shaft on which the specimen seal is designed to operate is then telescoped over the inboard end of driving spindle 13 and locked in place by a key 66. The outer rim 46 of the mandrel is chamfered to provide a pilot for guiding the mandrel beneath the lip as the driving spindle 13 is shifted to the left as permitted by stop collar 19. This collar is so adjusted that the sealing lip is properly seated and with the forward edge of the mandrel suitably spaced from disk 24.

To determine the torque loss of the specimen, the operator next removes locking pin 36 and rotates hand crank 47. As the mandrel rotates at moderate speed, its frictional contact with lip 41 tends to rotate the seal and drive spindle 15 in opposition to the calibrated torsion spring 50 coupled to the outer end of the spindle. The inner end of this spiral spring is anchored directly to spindle 15 in the manner illustrated in Figure 3, while its outer end 51 is riveted to the rim of a cupped housing member 52 suitably anchored to the outer face of pedestal 12. Also locked to the end of driven spindle 15 by a nut 53 is a second cupped casing 54 provided on its rim with a scale 55 graduated in ounces or any other desired unit. A pointer 56 overlies this scale with its point lying opposite the zero point of the scale when spring 50 is in its normal unstressed position.

While the safety pin 36 safeguards the spring against injury normally, it provides no assurance against operation of crank 41 counter-clockwise when pin 36 is removed. Obviously, reverse movement of spindle 15 would damage torsion spring 50. This cannot occur in the present instrument due to a pair of cooperating stop pins 60 and 61, best shown in Figure 3. Pin 60 is secured to pedestal 12, while pin 61 projects laterally from the end of spindle 15. When the spring is fully relaxed, the ends of the pins are slightly spaced from one another as clearly shown in Figure 3. Hence, only insignificant reverse rotation is possible.

From the foregoing, it will be clear that as the crank 47 is rotated in a clockwise direction the frictional drag of lip 41 on mandrel 45 rotates spindle 15 clockwise in opposition to the torsion spring 50 until the frictional drag is exactly balanced by the load imposed on spring 50. The moment the driving force exceeds this value, slippage occurs between the mandrel and the sealing lip. The reading on scale 55 at the moment slippage starts is known as the break-away torque of the specimen. Usually, the break-away torque is slightly greater than the running torque. The readings on scale 55 opposite pointer 56 therefore provide a direct indication of the frictional loss of the specimen both at the break-away point and under normal running conditions.

The removal of the specimen and the insertion of one of a different size is carried out expeditiously. The operator first replaces locking pin 36, shifts spindle 13 axially to the right, loosens nuts 38 and opens centering pins 37 to release the specimen. While holding the pins in their open position by means of rim 25, a different size specimen is inserted and clamped in place in the same manner described above. Ordinarily, the different size specimen will require a different size of mandrel. In this event, one of the proper size is substituted for the one then in place. The instrument is now in readiness for conducting a test.

If it is desired to use the instrument to test an anti-friction spring assembly, the test is carried out in exactly the same manner described above except that a slightly modified type of mandrel will be used having suitable gripping means on its exterior for frictionally engaging the inner circumference of the bearing raceway. Such means may consist of a corrugated or suitably shaped resilient surface designed to enter and lightly grip the inner surface of the raceway. The outer race of the bearing would, of course, be clamped against cover 24 by the clamping nuts 38 without interfering in any way with the rotation of the inner raceway.

From the foregoing, it will be apparent that the present invention provides a precision torquometer of great versatility, ruggedness and efficiency. The automatic means for centering the test specimen quickly and accurately is noteworthy for the simplicity of its construction and smoothness of operation, as well as for the fact that it includes means for clamping a test specimen in place without imposing any load or strain on the centering mechanism proper. This is for the reason that the movement of the centering elements is confined to a path normal to the axis of the driven spindle, whereas the clamping action for locking the specimen in place imposes only an axial load on pins 37.

While only a single embodiment of the invention has been expressly disclosed in detail hereinabove, it will be readily apparent to those skilled in this art that various other arrangements and constructional features can be resorted to without departure from the novel principles characterizing the invention. For example, the hand drive for spindle 13 may be replaced with a power drive such as a variable speed motor. And, of course, the instrument may be constructed to operate about a vertical rather than a horizontal axis. Accordingly, it will be understood that I do not wish to be limited except by the scope of the claims annexed hereto.

I claim:

1. An oil seal torquometer comprising anti-friction means supporting a rotary spindle, calibrated spring means for resisting rotation of said spindle, clamping means carried by said spindle for receiving and clamping any of a variety of sizes of oil seals therein, said clamping means including an outer case formed from a large diameter cupped disk, a closure disk across the open rim end of said outer case but disconnected therefrom, three pairs of interconnected links housed between said disks with an end of the links in each pair pivoted to a different one of said disks at equi-distantly spaced points thereon, clamping means carried on the opposite non-pivoted end of one link of each pair and projecting through arcuate slots in one of said disks, said clamping means being arranged to clamp any of a variety of sizes of test specimens against the outer face of said slotted disk with the axis of the specimen and of said rotary spindle in accurate axial alignment.

2. A torquometer adapted to make comparative torque loss tests on widely varying sizes of test specimens having concentrically arranged relatively rotatable elements, said torquometer including a driven spindle coupled to a torsion gauge, a driving spindle in axial alignment with said driven spindle, and readily disengageable specimen supporting means secured to one of said spindles for holding a specimen to be tested rigidly centered between said spindles, said supporting means including a pair of closely spaced large diameter disks one of which is rigidly secured to said spindle and the other of which is free to rotate with respect thereto, pairs of pivotally connected links having one end of each pivoted to equally spaced points on a different one of said disks, one link of each pair having an extension carrying an adjustable clamping means spaced equi-distantly from the axis of said spindles, said clamping means being cooperable with the surface of one of said disks to accurately center and clamp a specimen to be tested between said spindles.

3. A torquometer for comparing the frictional losses between the lips of different oil seals and the surface of a rotary shaft in contact therewith, said torquometer comprising means for supporting a rotary spindle with negligible frictional drag; normally unstressed calibrated spring means resisting rotation of said spindle; self-centering seal-clamping means carried by said spindle and having its axis aligned with the spindle axis, said clamping means including means for readily receiving and clamping any of a wide variety of oil seal sizes to said spindle with the seal axis accurately aligned with the spindle axis, said clamping means comprising a pair of axially spaced disks, a plurality of pairs of links pivotally connected together with one end of each pivoted to a different one of said disks at equally spaced points on said disks, and means carried by the free end of one link of each pair exteriorly of one disk for engaging the rim of an oil seal ring and clamping the same against the surface of said one disk; means for selectively supporting any of a wide variety of mandrel sizes concentrically of said clamping means; and means for rotating said mandrel supporting means.

4. In an oil seal torquometer a clamping means comprising a pair of axially spaced disks, a plurality of pairs of links pivotally connected together with one end of each pivoted to a different one of said disks at equally spaced points on said disks, and means carried by the free end of one link of each pair exteriorly of one disk for engaging the rim of an oil seal ring and clamping the same against the surface of said one disk.

5. A torquometer for comparing the frictional losses between the lips of different oil seals and the surface of a rotary shaft in contact therewith, said torquometer comprising means for supporting a rotary spindle with negligible frictional drag; calibrated means resisting rotation of said spindle; self-centering seal-clamping means carried by said spindle coaxially therewith, said seal-clamping means comprising a pair of axially spaced disks, a plurality of pairs of links, at equally spaced points on said disks, each pair being pivotally connected together with one end of each pivoted to a different one of said disks, the free end of one link of each pair exteriorly of one disk having means for clamping the rim of an oil seal ring against the surface of said one disk; and rotatable mandrel supporting means mounted concentric with said seal-clamping means.

6. A torquometer adapted to make comparative torque-loss tests on test specimens having concentrically arranged relatively rotatable elements, said torquometer including a driven spindle coupled to a torsion gauge, a driving spindle in axial alignment with said driven spindle, and specimen supporting means including a first disk rigidly secured to said driven spindle, a second disk spaced from said first disk and free to rotate with respect thereto, pairs of pivotally connected links having one end of each pivoted to equally spaced points on a different one of said disks, one link of each pair having an extension carrying an adjustable clamping means spaced equidistantly from the axis of said spindles, said clamping means being cooperable with the surface of one of said discs to accurately center and clamp a specimen to be tested between said spindles.

7. In an oil-seal torquometer, clamping means for receiving and clamping any of a variety of sizes of oil seals therein, said clamping means including an outer case formed from a large diameter cupped disk, a closure disk across the open rim end of said outer case but disconnected therefrom, three pairs of interconnected links housed between said disks with an end of the links in each pair pivoted to a different one of said disks at equidistantly spaced points thereon, clamping means carried on the opposite non-pivoted end of one link of each pair and projecting through arcuate slots in one of said disks, said clamping means being arranged to clamp any of a variety of sizes of test specimens against the outer face of said slotted disk with the axes of the specimen and of said disk in accurate alignment.

References Cited in the file of this patent
UNITED STATES PATENTS

| | | |
|---|---|---|
| 157,030 | Slack | Nov. 17, 1874 |
| 227,114 | Kirkham | May 4, 1880 |
| 424,698 | Bailey | Apr. 1, 1890 |
| 2,038,092 | Wheeler | Apr. 21, 1936 |
| 2,091,022 | Stuart | Aug. 24, 1937 |
| 2,392,260 | Piatt | Jan. 1, 1946 |
| 2,586,708 | Petit | Feb. 19, 1952 |
| 2,642,740 | Stephenson | June 23, 1953 |